Figure 1:
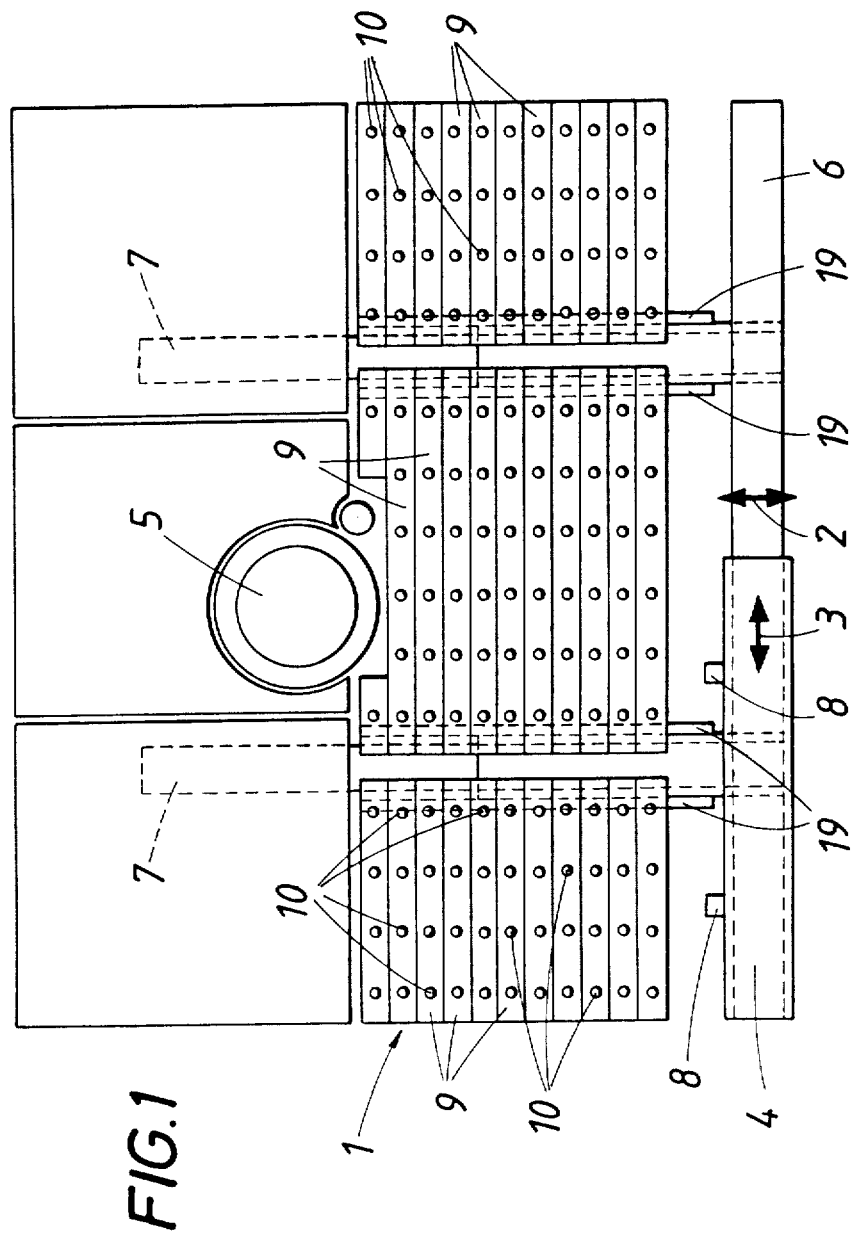

United States Patent [19]

Haider

[11] Patent Number: 4,501,523
[45] Date of Patent: Feb. 26, 1985

[54] APPARATUS FOR FEEDING PLATELIKE WORKPIECES TO A MACHINE TOOL

[75] Inventor: Ludwig Haider, Ennsdorf, Austria

[73] Assignee: Voest-Alpine Aktiengesellschaft, Linz, Austria

[21] Appl. No.: 483,104

[22] Filed: Apr. 8, 1983

[30] Foreign Application Priority Data

May 19, 1982 [AT] Austria .................................. 1987/82

[51] Int. Cl.³ .............................................. B65H 5/08
[52] U.S. Cl. ...................... 414/19; 414/753; 271/268; 271/85
[58] Field of Search .................. 414/14, 16, 17, 19, 414/749, 751, 753; 271/268, 267, 269, 84, 85; 269/13; 198/721, 747

[56] References Cited

FOREIGN PATENT DOCUMENTS

| 26755 | 4/1981 | European Pat. Off. |
| 2265390 | 5/1979 | Fed. Rep. of Germany |
| 7319318 | 12/1974 | France |
| 1548803 | 7/1979 | United Kingdom |

Primary Examiner—Robert J. Spar
Assistant Examiner—Donald W. Underwood
Attorney, Agent, or Firm—Kurt Kelman

[57] ABSTRACT

Apparatus for feeding platelike workpieces to a machine tool comprises a feed deck adapted to carry a workpiece, a carriage, which carries tongs for gripping the workpiece and is movable in longitudinal and transverse directions to move the workpiece in said directions, a carriage track, which extends in said transverse direction and is mounted on said feed deck to be movable in said longitudinal direction and extends in said transverse direction and is adapted to guide said carriage in said transverse directions, workpiece-supporting elements, which are vertically adjustably mounted on said feed deck and adapted to support a workpiece and arranged in a plurality of rows extending in said transverse direction, a plurality of actuating shafts, each of which is operatively connected to the workpiece-supporting elements of one of said rows and rotatable to vertically adjust the workpiece-supporting elements of said row and is non-rotatably connected to a crank arm, which is operable by a bar, which is rigid with said carriage track. To permit a simple adjustment and a uniform raising and lowering of the workpiece-supporting elements, the workpiece-supporting elements of each row are mounted on at least one vertically adjustable crossbeam, which is operatively connected to one of said actuating shafts by a toggle joint comprising a first lever, which is non-rotatably connected to said actuating shaft, and a second lever which is pivoted near one end to said first lever and near its other end to the associated crossbeam.

9 Claims, 4 Drawing Figures

APPARATUS FOR FEEDING PLATELIKE WORKPIECES TO A MACHINE TOOL

This invention relates to apparatus for feeding platelike workpieces to a machine tool, which apparatus comprises a feed deck adapted to carry a workpiece, and a carriage, which carries tongs for gripping the workpiece and is movable in longitudinal and transverse directions to move the workpiece in said directions, a carriage track, which is mounted on said feed deck to be movable in said longitudinal direction and extends in said transverse direction and is adapted to guide said carriage in said transverse direction, workpiece-supporting elements which are vertically adjustably mounted on said feed deck and adapted to support a workpiece and arranged in a plurality of rows extending in said transverse direction, a plurality of actuating shafts, each of which is operatively connected to the workpiece-supporting elements of one of said rows and rotatable to vertically adjust the workpiece-supporting elements of said row and is non-rotatably connected to a crank arm, which is operable by a cam bar, which is rigid with said carriage track.

When it is desired to align a platelike workpiece relative to a machine tool, such as a stamping machine the workpiece must be adjustable on a feed deck which is associated with the machine tool. For this purpose the workpiece must be movable transversely to its usual feed direction, which will be described as the longitudinal direction. The workpiece is fixed to a carriage, which is guided in a transverse direction on a carriage track, which is displaceable in the longitudinal direction. Because the workpiece is slidably supported on workpiece-supporting elements carried by the feed deck, the movement of the carriage will be obstructed by the workpiece-supporting elements if they protrude into the path of the carriage. These difficulties can be avoided if the workpiece-supporting elements can be lowered adjacent to the carriage. In one known apparatus of that kind, disclosed in German Patent Publication No. 22 65 390, the workpiece-supporting elements consist of supporting rods, which are vertically adjustably mounted in the feed deck and arranged in transversely extending rows and the supporting rods of each row are supported by a camshaft. A crank arm is non-rotatably connected to each of said camshafts at each end thereof and is operable by a cam bar, which is rigid with the carriage track. When the carriage carrying the workpiece is moved in the longitudinal direction by a longitudinal movement of the carriage track, the cam bar is also displaced in the longitudinal direction and acts on the crank arms of each camshaft as it is approached by the carriage so that said camshaft will be rotated. The cams of the camshafts have such a shape that the supporting rods supported by said cams will be lowered. As the supporting rods are arranged in transverse rows and the supporting rods of each row are adjusted in unison by the associated camshaft, the movement of the carriage on the transversely extending carriage track will not be obstructed by the supporting rods which have been lowered.

To ensure that the supporting rods will not exert a torque on the camshaft and will be reliably held in their supporting position, each supporting rod bears centrally on a flat cam face of the associated camshaft when the supporting rod is in its supporting position. Whereas in that arrangement the supporting rods will not exert a torque on the camshaft when the supporting rods are in their supporting position, each supporting rod must be slightly lifted by the associated camshaft before the supporting rod can be lowered and that lifting of the supporting rod will result in a deformation of the workpiece, which is non-yieldably held in the gripping tongs carried by the carriage. Besides, it is hardly possible to adjust the top ends of all supporting rods to the same level and to maintain them in the adjusted position in order to ensure that the workpiece will be supported in a single plane. Moreover, relatively strong friction forces will be effective between the camshafts and the supporting rods, particularly if the workpieces are heavy, and these friction forces will result in a heavy wear.

It is an object of the invention to avoid these disadvantages and to provide with simple means such an improvement of apparatus for feeding platelike workpieces to a machine tool that the workpiece-supporting elements can be adjusted in a simple manner and can be uniformly raised and lowered without a danger of a bending of the workpiece.

This object is accomplished according to the invention in that the workpiece-supporting element of each row are mounted on at least one vertically adjustable crossbeam, which is operatively connected to one of said actuating shafts by at least one toggle joint comprising a first lever, which is non-rotatably connected to said actuating shaft, and a second lever, which is pivoted near one end to said first lever and near the other end to the associated crossbeam.

An advantage afforded by the mounting of the workpiece-supporting elements on a plurality of crossbeams resides in that it is not necessary to provide separate means for raising and lowering each workpiece-supporting elements so that much simpler means may be used to impart a uniform movement to the workpiece-supporting element of a transverse row. The crossbeams can also be used to adjust the top ends of all workpiece-supporting element to a desired level without a need for a high structural expenditure. But the essential advantage which is afforded by the invention is due to the actuation of the crossbeams by the toggle joints, by which the desired movement can be imparted to the crossbeams in spite of the weight of the workpiece without a risk of a bending of the workpiece. After the toggle joints have been fully extended, the crossbeams will be lowered by a rotation of the actuating shafts and the lowermost position of the crossbeam can be defined by suitable stops. The workpiece-supporting elements will assume their uppermost position when the toggle joints are fully extended. It is apparent that the actuation of the crossbeams by means of toggle joints results in desirable conditions regarding the motion of the crossbeams, the forces which are exerted, and the wear. The actuating shaft can easily be rotated by means of a crank arm, which is operated by cam bar, which is rigid with the carriage track. For this purpose the cam bar may have a cam surface which is engageable with the crank arms of a plurality of actuating shafts in succession and is designed to impart the desired movement of the crossbeams. To reduce the friction, the surface may be constituted by a groove and the crank arm may be provided with a roller entering into said groove.

To ensure that the toggle joint does not exert a torque on the actuating shaft, the crank arm may be integral with that lever of the toggle joint which is non-rotatably connected to the actuating shaft. No torque will be exerted by the workpiece supported by the workpiece-supporting elements if the second lever of each toggle joint is pivoted at its said other end to the associated crossbeam on a horizontal axis which is disposed above and parallel to and vertically aligned with the axis of the associated actuating shaft and said cam bar is adapted to cooperate with each of said crank arms so as to oscillate the associated toggle joint between a fully extended position and an angled position. Any bending of each actuating shaft under the load applied by the toggle joint will be minimized if the actuating shaft is supported close to said toggle joint.

A simple structure permitting a vertical displacement of the crossbeams comprises vertical columns, by which the crossbeams are vertically guided by means of low-friction sleeves, which are secured to the crossbeams and surround the columns.

Figure 2:
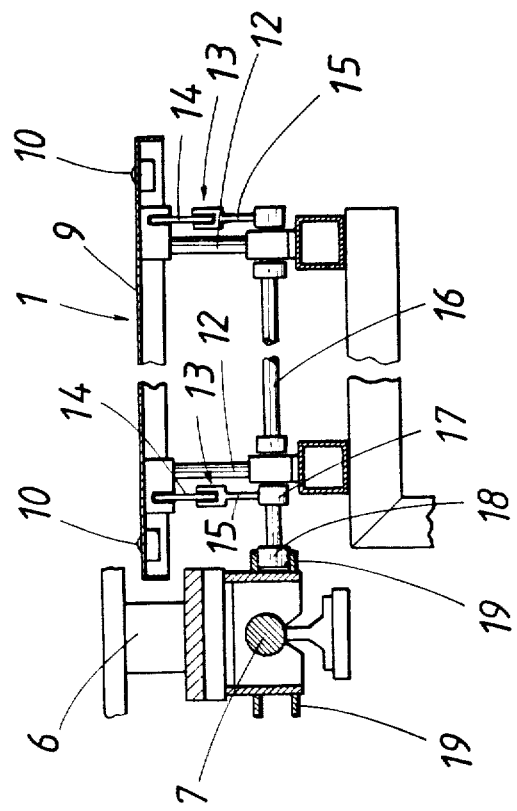
Figure 3:
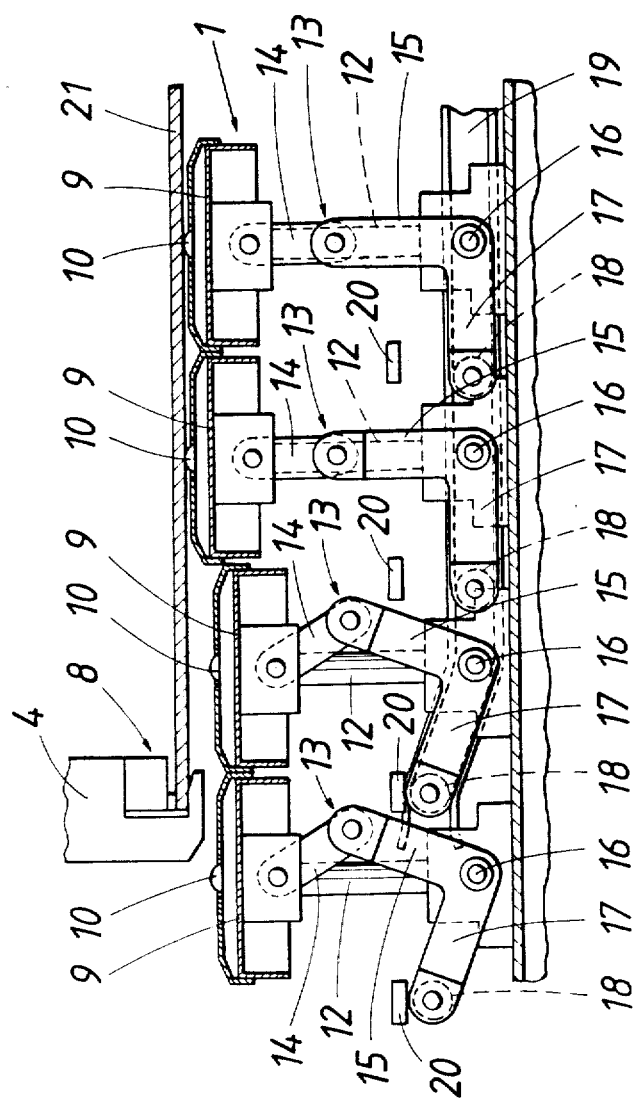
Figure 4:
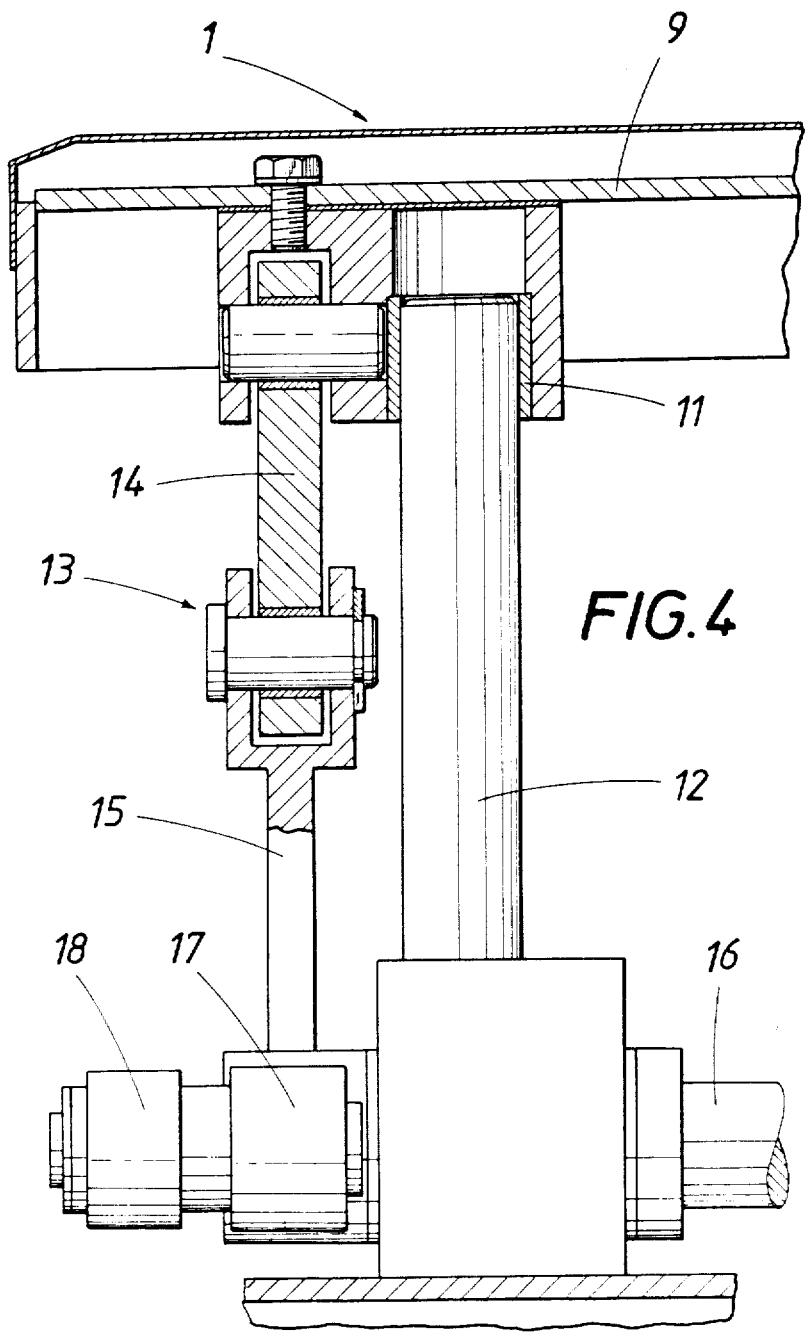

The subject matter is shown diagrammatically and by way of example on the drawings, in which:

FIG. 1 is a simplified top plan view showing apparatus according to the invention for feeding platelike workpieces to a machine tool, FIG. 2 is a simplified fragmentary transverse sectional view showing a portion of said apparatus, FIG. 3 is an enlarged diagrammatic longitudinal sectional view showing a feed deck and FIG. 4 is a fragmentary transverse sectional view showing on a still larger scale the means for adjusting a crossbeam of the feed deck.

As is particularly apparent from FIG. 1, the apparatus which is shown comprises a horizontal feed deck 1, on which each workpiece can be horizontally displaced relative to a machine tool 5 by means of a carriage 4 in a longitudinal direction 2 toward the machine tool and in a transverse direction 3. For this purpose the carriage 4 is movable on a carriage track 6, which extends in the transverse or first direction 3 and can be displaced in the longitudinal or second direction 2 on slide rails 7. The workpiece is gripped by gripping tongs 8 carried by the carriage 4 and can be moved to a desired position relative to the machine tool 5 in the manner indicated above. To permit the movement carriage 4 over the feed deck 1, those portions of the feed deck which are adjacent to the carriage 4 must be lowered. For this purpose the feed deck 1 consisting of two side sections and an intermediate section comprises crossbeams 9, each of which carries a plurality of workpiece-supporting balls 10 arranged in a row. The crossbeams 9 carry low-friction sleeves 11, which are vertically slidably mounted on vertical guide columns 12. Each crossbeams 9 can be raised and lowered by at least one toggle joint 13, which comprises a first lever 15, which is non-rotatably connected to a horizontal actuating shaft 16 associated with the crossbeam, and a second lever 14, which is pivoted near one end to the first lever 15 and near the other end to the associated crossbeam 9. Each actuating shaft 16 carries at least one crank arm 17, which in the embodiment shown by way of example is combined with the first lever 15 of an adjacent toggle joint 13 to form a bellcrank lever, although this is not essential. The crank arm 17 is provided with a laterally disposed roller 18, which extends into a cam groove formed in a cam bar 19, which is rigidly connected to the carriage track 6 and in unison with the latter and with the carriage 4 is movable relative to the crank arms 17 in the longitudinal direction. During that movement of the cam bar 19 relative to the crank arms 17, a pivotal movement is imparted to the crank arms 17, which carry the rollers 18 extending into the cam groove of the cam bar 19. That pivotal movement of each crank arm 17 results in a rotation of the associated actuating shaft 16 and in an adjustment of the toggle joint 13. The cam groove of the cam bar 19 is so designed that during a result of the forward longitudinal movement of the carriage track 6 toward the machine tool 5, the crank arm 17 associated with each crossbeam 9 approached by the carriage workpiece-supporting elements 10 carried by said crossbeam, will be pivotally moved by said cam groove in such a sense that said cross beam will be lowered during the displacement of the carriage track 6 along the slide rails 7 so that the movement of the carriage 4 over the feed deck 1 in the longitudinal and transverse directions will not be obstructed by said crossbeams.

To ensure that the crossbeams need not be held in their lower position by the bar 19, which would have to be rather long in that case, it is possible to provide stops 20, which limit the pivotal movement of the crank arms 17 and maintain the crank arms in such a position that the rollers 18 will reliably enter the cam bar 19 when the carriage 4 is subsequently moved over the feed deck 1 in a reverse direction by means of the carriage track 6 so that the crank arms 17 will then be pivotally moved in sense which is opposite to that in which they have been moved during the advance of the carriage, and the associated toggle joints will be moved to their fully extended position, in which the crossbeams are in their upper or supporting position. In that position the workpiece 21 disposed on the feed deck 1 will be reliably supported and will not exert any torque on the actuating shafts 16, as is particularly apparent from FIG. 3. The toggle joints 13 may be held in their fully extended position by suitable stops, which may be adjustable to eliminate and backlash.

Because the feed deck 1 consists of two side sections and an intermediate section, the carriage track 6 can be displaced along slide rails which are installed between the intermediate section and each side section of the feed deck 1. In that case each crossbeam 9 cannot extend throughout the width of the deck and the crossbeams associated with respective sections of the deck must be individually raised and lowered. In a simple arrangement, at least one cam bar is provided for each deck section and may extend along the slide rails 7.

What is claimed is:

1. In apparatus for feeding platelike workpieces, comprising a horizontal feed deck, a carriage track extending in a first horizontal direction and carried by said feed deck and movable thereon in a second horizontal direction, which is transverse to said first direction, a carriage, which is carried by and movable in unison with and along said carriage track, gripping tongs carried by said carriage and adapted to connect a workpiece to said carriage so that said workpiece is movable with said carriage in said first and second directions, a plurality of workpiece-supporting elements carried by said feed deck and vertically adjustable relative thereto and arranged in a plurality of rows, which extend in said first direction and are spaced in said second direction, a plurality of horizontal actuating shafts, each of which extends in said first direction and is operatively connected to said workpiece-supporting elements of one of said rows and rotatable to vertically adjust said workpiece-supporting elements of said row, a plurality of crank arms, each of which is non-rotatably connected to one of said actuating shafts, and a cam bar, which extends generally in said second direction and is rigid with said carriage track and adapted to cooperate with said crank arms and to rotate successive ones of said actuating shafts as said carriage track is moved in said second direction, the improvement residing in that said feed deck comprises a plurality of crossbeams, which are individually vertically adjustable and extend in said first direction and are spaced in said second direction, said workpiece-supporting elements of each of said rows are carried by one of said crossbeams, and each of said actuating shafts is operatively connected to one of said crossbeams by a toggle joint comprising a first lever, which is non-rotatably connected to said actuating shaft, and a second lever, which is pivoted near one end to said first lever and near its other end to said crossbeam.

2. The improvement set forth in claim 1, wherein a plurality of vertical guide columns are provided and said cross-beams are vertically slidably mounted on said columns.

3. The improvement set forth in claim 1, wherein means are provided which support each of said actuating shafts adjacent to said first lever of the associated toggle joint.

4. The improvement set forth in claim 1, wherein each of said crank arms is integral with said first lever of one of said toggle joints.

5. The improvement set forth in claim 1, wherein said other end of said second lever of each of said toggle joints is pivoted to the associated crossbeam on a horizontal axis which is disposed above and parallel to and vertically aligned with the axis of the associated acuating shaft and said cam bar is adapted to cooperate with each of said crank arms so as to oscillate the associated toggle joint between a fully extended position and an angled position.

6. The improvement set forth in claim 5, wherein stop means are provided which are arranged to prevent a movement of each of said toggle joints from said angled position beyond said fully extended position.

7. In apparatus for feeding platelike workpieces, comprising a horizontal feed deck, a carriage track extending in a first horizontal direction and carried by said feed deck and movable thereon in a second horizontal direction, which is transverse to said first direction, a carriage, which is carried by and movable in unison with and along said carriage track, gripping tongs carried by said carriage and adapted to connect a workpiece to said carriage so that said workpiece is movable with said carriage in said first and second directions, a plurality of workpiece-supporting elements carried by said feed deck and vertically adjustable relative thereto and arranged in a plurality of rows, which extend in said first direction and are spaced in said second direction, a plurality of crank arms, each of which is rotatably mounted on a stationary axis which extends in said first direction, and a cam bar, which extends generally in said second direction and is rigid with said carriage track and arranged to cooperate with each of said crank arms so as to impart to them an angular oscillation about said axis as said carriage track is reciprocated in said second direction, and a plurality of adjusting mechanisms, each of which is operatively connected to one of said crank arms and to said workpiece-supporting elements of one of said rows and arranged to transform said angular oscillation of said crank arms to a vertical oscillation of the workpiece-supporting elements of said row, the improvement residing in that each of said adjusting mechanisms comprises a crossbeam, which is vertically adjustable and extends in said first direction and carries said workpiece-supporting elements of one of said rows, and a toggle joint comprising a first lever, which is integral at one end with the associated crank arm, and a second lever, which is pivoted at its one end to the other end of said first lever and is pivoted at its other end to said crossbeam.

8. The improvement set forth in claim 7, wherein said other end of said second lever of each of said toggle joints is pivoted to the associated crossbeams on a horizontal axis which is disposed above and parallel to and vertically aligned with said stationary axis and said cam bar is adapted to cooperate with each of said crank arms so as to oscillate the associated toggle joint between a fully extended position and an angled position.

9. The improvement set forth in claim 8, wherein stop means are provided which are arranged to prevent a movement of each of said toggle joints from said angled position beyond said fully extended position.

* * * * *